(12) United States Patent
Kleinschmidt et al.

(10) Patent No.: US 6,476,987 B1
(45) Date of Patent: Nov. 5, 2002

(54) EXCIMER LASER WITH LINE NARROWING

(75) Inventors: Juergen Kleinschmidt, Weissenfels; Peter Heist, Jena; Matthias Kramer, Goettingen, all of (DE)

(73) Assignee: Lambda Physik AG, Goettingen (DE)

( * ) Notice: Subject to any disclaimer, the term of this patent is extended or adjusted under 35 U.S.C. 154(b) by 75 days.

(21) Appl. No.: 09/629,256

(22) Filed: Jul. 31, 2000

Related U.S. Application Data (60) Provisional application No. 60/147,219, filed on Aug. 4, 1999.

(51) Int. Cl.[7] .................................................. G02B 5/04
(52) U.S. Cl. ........................ 359/837; 359/831; 362/100
(58) Field of Search ................................ 359/837, 831, 359/563, 330; 372/100, 24, 29, 32, 92, 98, 20, 23

(56) References Cited

U.S. PATENT DOCUMENTS

| | | | |
|---|---|---|---|
| 3,611,436 A | 10/1971 | Rigrod | 372/20 |
| 3,775,699 A | 11/1973 | Cassels | 372/19 |
| 3,868,592 A | 2/1975 | Yarborough et al. | 331/94.5 |
| 4,399,540 A | 8/1983 | Bucher | 372/20 |
| 4,573,765 A * | 3/1986 | Ireland | 350/286 |
| 4,696,012 A | 9/1987 | Harshaw | 372/99 |
| 4,829,536 A | 5/1989 | Kajiyama et al. | 372/57 |
| 4,856,018 A | 8/1989 | Nozue et al. | 372/98 |
| 4,873,692 A | 10/1989 | Johnson et al. | 372/20 |
| 4,905,243 A | 2/1990 | Lokai et al. | 373/32 |
| 4,942,583 A | 7/1990 | Nazarathy et al. | 372/20 |
| 4,972,429 A | 11/1990 | Herbst | 372/100 |
| 4,975,919 A | 12/1990 | Amada et al. | 372/33 |
| 4,977,563 A | 12/1990 | Nakatani et al. | 372/32 |
| 4,985,898 A | 1/1991 | Furuya et al. | 372/106 |

(List continued on next page.)

FOREIGN PATENT DOCUMENTS

| | | | |
|---|---|---|---|
| EP | 0 472 727 A1 | 3/1992 | H01S/3/1055 |
| EP | 0 395 717 B1 | 9/1993 | A61B/17/36 |
| EP | 0 402 570 B1 | 1/1998 | H01S/3/08 |
| EP | 1 041 689 A1 | 10/2000 | H01S/3/1055 |
| EP | 1 102 368 A2 | 5/2001 | H01S/3/081 |
| EP | 1 119 083 A2 | 7/2001 | H01S/3/08 |
| JP | 60-205420 | 10/1985 | G02B/27/00 |
| WO | WO 96/16455 | 5/1996 | H01S/3/08 |

OTHER PUBLICATIONS

S.A. Myers, "An Improved Line Narrowing Technique for Dye Laser by a Nitrogen Laser," *Optics Communications*, vol. 4, No. 2, Oct. 1971, pp. 187–189.

T.W. Hänsch, "Repetitively Pulsed Tunable Dye Laser for High Resolution Spectroscopy," *Applied Optics*, Apr. 1972, vol. 11, No. 4, pp. 895–898.

A. Bloom, "Modes of a Laser Resonator Containing Tilted Birefringent Plates," *J. of the Optical Society of America*, vol. 64, No. 4, Lancaster Press, Inc., Lancaster PA, Apr. 1974, pp. 447–452.

(List continued on next page.)

*Primary Examiner*—Mohammad Sikder
(74) *Attorney, Agent, or Firm*—Sierra Patent Group, Ltd.; Andrew V. Smith (57) ABSTRACT

A line narrowing unit for use within an excimer or molecular fluorine laser resonator includes a dispersive prism having antireflection coatings on entrance and exit surfaces. Entrance and exit angles and an apex angle are increased to enhance the dispersive power of the prism, while the antireflective coatings limit reflective losses. Preferably, a laser beam makes a non-symmetric pass through said prism. The apex angle is preferably greater than 65°, or even 75°, and the angle of incidence and the exit angle of the beam are each preferably greater than 65°. A beam expanding prism configured for enhanced beam expansion has an apex angle between within a range of 37.5° and 42.5°, and a beam incidence angle at the entrance surface of more than 65°, and an antireflection coating on preferably both the entrance and exit surfaces.

46 Claims, 8 Drawing Sheets

U.S. PATENT DOCUMENTS

| | | | |
|---|---|---|---|
| 5,081,635 A | 1/1992 | Wakabayashi et al. | 372/57 |
| 5,095,492 A | 3/1992 | Sandstrom | 372/102 |
| 5,142,543 A | 8/1992 | Wakabayashi et al. | 372/32 |
| 5,856,991 A | 8/1992 | Ershov | 372/57 |
| 5,150,370 A | 9/1992 | Furuya et al. | 372/106 |
| 5,226,050 A | 7/1993 | Burghardt | 372/20 |
| 5,404,366 A | 4/1995 | Wakabayashi et al. | 372/29 |
| 5,414,723 A | 5/1995 | Krapchev | 372/3 |
| 5,559,816 A | 9/1996 | Basting et al. | 372/27 |
| 5,596,456 A | 1/1997 | Luecke | 359/831 |
| 5,596,596 A | 1/1997 | Wakabayashi et al. | 372/102 |
| 5,646,954 A | 7/1997 | Das et al. | 373/55 |
| 5,657,334 A | 8/1997 | Das et al. | 372/33 |
| 5,659,419 A | 8/1997 | Lokai et al. | 359/330 |
| 5,663,973 A | 9/1997 | Stamm et al. | 373/20 |
| 5,684,822 A | 11/1997 | Partlo | 372/95 |
| 5,748,316 A | 5/1998 | Wakabayashi et al. | 356/352 |
| 5,761,236 A * | 6/1998 | Kleinschmidt et al. | 372/100 |
| 5,802,094 A | 9/1998 | Wakabayashi et al. | 372/57 |
| 5,835,520 A | 11/1998 | Das et al. | 372/57 |
| 5,852,627 A | 12/1998 | Ershov | 372/108 |
| 5,898,725 A | 4/1999 | Fomenkov et al. | 372/102 |
| 5,901,163 A | 5/1999 | Ershov | 372/20 |
| 5,917,849 A | 6/1999 | Ershov | 372/102 |
| 5,946,337 A | 8/1999 | Govorkov et al. | 372/92 |
| 5,970,082 A | 10/1999 | Ershov | 372/102 |
| 5,978,409 A | 11/1999 | Das et al. | 372/100 |
| 5,999,318 A | 12/1999 | Morton et al. | 359/572 |
| 6,288,832 B1 * | 9/2001 | Richman et al. | 359/330 |

OTHER PUBLICATIONS

M. Okada, et al., "Electronic Tuning of Dye Lasers by an Electrooptic Birefringent Fabry–Perot Etalon," *Optics Communications*, vol. 14, No. 1, North–Holland Publishing Co., Amsterdam, May 1975, pp. 4–7.

J. R. Woodworth, et al., "An Efficient, High–Power F2 Laser Near 157nm," *J. of Chem. Physics*, vol. 69, No. 6, American Institute of Physics, Sep. 15, 1978, pp. 2500–2504.

S. Saikan, "Nitrogen–Laser–Pmped Single–Mode Dye Laser," *Applied Physics*, 1978, pp. 41–44.

Wolfgang Demtröder, *Laser Spectroscopy: Basic Concepts and Instrumentation*, Mar. 1981, pp. 128, 277.

Irving J. Nigio, et al., "Injection–Locking Unstable Resonator Excimer Lasers," *EEE J. of Quantum Electronics*, vol. QE–19, No. 9, Sep. 1983, pp. 1426–1436.

Armadillo, et al., "Simple, Compact, High-repetition Rate XeCl Laser," *Review of Scientific Instruments*, vol. 56, No. 5, Part 1, 1985, pp. 674–676.

T. J. McKee, "Spectral–narrowing Techniques for Excimer Laser Oscillators," *Canadian J. of Physics*, vol. 63m No. 2, Feb. 1985, pp. 214–219.

V. N. Ischenko, et al., "High–Power Efficient Vacuum Ultraviolet F2 Laser Excited by an Electric Discharge," vol. 16, No. 5, *American Institute of Physics*, May 1986, pp. 707–709.

K. Wani, et al., "Narrow–band KrF Excimer Laser —Tunable and Wavelengh Stabilized," *SPIE —The International Society for Optical Engineering*, Excimer Beam Applications, vol. 998, Sep. 6, 1988, Boston, MA, pp. 2–8.

R. K. Brimacombe, et al., 37 Line–Narrowed Industrial Excimer Laser for Microlithography," *Conference on Lasers and Electro–optics*, 1989 Technical Digest Series, vol. 11, Apr. 24–29, 1989, Baltimore, MD, 24 pages.

Richard Sandstrom, "Measurements of Beam Characteristics Relevant to DUV Microlithography on a KrF Excimer Laser,"*SPIE*, vol. 1264, 1990, pp. 505–519.

M. Kakehata, et al., "Experimental Study of Tunability of a Discharge Pumped Molecular Fluorine Laser," *Conference on Lasers and Electro–optics*, vol. 7, Optical Society of America, May 1990., pp. 106–108.

J.H.C. Sedlacek, et al., "Optical Materials for Use with Excimer Lasers," *SPIE*, vol. 1835, Excimer Lasers, 1992, pp. 80–88.

D. J. Krajnovich, et al., "Testing of the Durability of Single–Crystal Calcium Fluorine with and without Antireflection Coatings for use with High–power KrF Excimer Lasers," *Applied Optics*, vol. 31, No. 28, Oct. 1, 1992, pp. 6062–6075.

M. Mizoguchi, et al., "100–fs, 10Hz, terawatt KrF Laser," *J. Opt. Soc. Am. B.*, vol. 9, No. 4, Apr. 1992, pp. 560–564.

Z. Haixing, et al., "Some Problems in 1:1 Broadband Excimer Laser Lithography," *Proceedings, SPIE*, Optical/Laser Microlithography V, Mar. 11–13, 1992, vol. 1674, pp. 701–706.

Shintaro Kawata, et al., "Spatial Coherence of KrF Excimer Lasers," *Applied Optics*, vol. 31, No. 3, Jan. 20, 1992, pp. 387–396.

Nagai, et al., "Development of High Power Narrow Spectrum–Tunable Excimer Laser," *Mitsubishi Heavy Industries Report*, vol. 30, No. 5, 1993–9, pp. 443–446. (includes the translation).

Abstract and handouts of an Aug. 15–18, 1995 conference in Colorado Springs, Colorado, from First International Symposium on 193nm Lithography. "ArF Excimer Laser with High Repetition Rate for DUV Lithography," by R. Patzel, et al., 1 page.

Hecht, *Optic*, pp. 172–173.

Y.G. Basov, Telescopic and Dispersive Prism Devices for Laser Technology," *J. Opt. Technol.*, vol. 62, No. 3, Mar. 1995, pp. 141–152.

M. Rothschild, et al., "Optical Materials for 193–nm Lithography," *First Intl. Symp. On 193nm Lithography*, Digest of Abstracts, Aug. 15–18, 1995, 1 page.

M. Rothschild, et al., "193–nm Lithography," *Proceedings of SPIE*, Lasers as Tools for Manufacturing of Durable Goods and Microelectronics, Jan. 29–Feb. 2, 1996, San Jose, CA vol. 2703, pp. 398–404.

"Press Release entitled: Lambda Physik shows readiness for the future challenges of microlothography," Fort Lauderdale, FL, Dec. 1997, 2 pages.

U. Stamm, et al., "ArF Excimer Laser for 193 nm Lithography," paper presented at SPIE's $22^{nd}$ Annual Int. Symp. On Microlithography, *SPIE*, vol. 3051–42, Mar. 9–14, 1997, Santa Clara, CA, USA., pp. 868–873.

J.H.C. Sedlacek, et al., "Performance of Excimer Lasers as Light Sources for 193–nm Lithography," *Proceedings of SPIE*, Optical Microlithography X, Mar. 12–14, 1997, Santa Clara, CA, vol. 3051, pp. 874–881.

Technology Wold Briefs,"Lasers Could Extend Optical Lithography into VUV," *Photonics Spectra*, Jan. 1998, p. 48.

D. Basting, et al., "Processing of PTFE with High Power VUV Laser Radiation," 2 pages.

D. Basing, "Industrial Excimer Lasers," pp. 40–41.

Eugene Hecht, *Optics*, $2^{nd}$ edition, pp. 163–166.

* cited by examiner

# EXCIMER LASER WITH LINE NARROWING

PRIORITY

This application claims the benefit of priority to U.S. provisional patent application No. 60/147,219 filed Aug. 4, 1999.

BACKGROUND OF THE INVENTION

1. Field of the Invention

The present invention relates to a efficient prism configurations for line-narrowing resonators of excimer or molecular fluorine laser systems beams having at desired spectral bandwidths.

2. Description of the Related Art

One application of the present invention is in the use of excimer lasers or molecular fluorine lasers as a light source for steppers and/or scanners for photographic microlithography in semiconductor manufacture. When such lasers are used for microlithography, it is desired to have laser emissions within a range which is much smaller than the natural laser linewidth of approximately 300 to 400 picometers (pm).

The extent of line narrowing desired for a particular application depends on the imaging optics of stepper/scanner devices. For refractive illumination optics, line-narrowing to less than 1 pm is desired, and between 10 pm and 100 pm bandwidths are desired for catadioptric or all-reflective illumination systems.

For use of excimer or molecular fluorine lasers in microlithography with catadioptric illumination systems a moderate narrowing of the laser bandwidth is sufficient. Examples of lasers that can be used in such applications are eximer lasers such as KrF lasers (emission wavelength approximately 248 nm) and ArF lasers (emission wavelength 193 nm) and molecular fluorine lasers emitting around 157 nm. Prisms are the line narrowing elements of choice for semi-narrow band laser resonators used with catadioptric illumination systems, since their losses are low and their durability is high in comparison to other elements like gratings.

Line narrowing for excimer or molecular fluorine lasers can be achieved by inserting prisms as wavelength dispersive elements in the resonator. The number of prisms and their arrangement determine the achievable bandwidth. Generally, the larger the number of prisms the narrower the bandwidth produced by the laser. Since the number of optical elements is directly correlated with losses in the resonator, the number of elements should be as low as possible in accordance with the bandwidth it is desired to achieve.

Previously dispersive prisms were Brewster prisms. These Brewster prisms are prisms where the apex angle is chosen in such a manner that the incident and exit angle are equal to the Brewster's angle. These angles are chosen to be the Brewster angle because reflective loses are at a minimum at the Brewster's angle. In the present invention, anti-reflective coatings allow incident angles to be greater than the Brewster angle while at the same time minimizing reflective losses.

It is desired to have a resonator arrangement including one or more dispersive prisms having optimized apex angles and beam entrance and exit surfaces, and oriented to optimize beam entrance and exit angles, to achieve more efficient bandwidth narrowing. It is also desired to configure optimum beam expansion prisms when used with a line selection element such as a dispersive prism, etalon or grating.

RECOGNIZED IN THE INVENTION

In accordance with any specific requirements for line narrowing, it is recognized in the invention that losses in the resonator may be minimized by minimizing the number of elements in the laser resonator. In order to minimize the number of elements in the resonator, it is further recognized in the invention that angles related to the prisms in the resonator, i.e., the angle of incidence, the angle of exit, the prism angle, and the apex angle of the prism, as well as surfaces of the prisms, may be advantageously optimized,

SUMMARY OF THE INVENTION

It is therefore an object of the invention to provide a line-narrowing resonator including one or beam expanding and/or dispersive prisms configured to achieve a desired narrowed bandwidth, while minimizing reflective losses at surfaces of the prisms, such as by minimizing the number of prism surfaces and/or by optimally configuring the prism surfaces, to achieve an optimal combination of line-narrowing and loss reduction in the resonator.

In a first aspect of the invention, in accord with the above object, a laser is provided, which is preferably an excimer or molecular fluorine laser, for generating an output having predetermined wavelength and bandwidth characteristics. The laser has a line-narrowing resonator including a dispersive prism, wherein the beam makes a non-symmetric pass through the prism, such that the angle of incidence at the entrance surface is different than the exit angle of the beam at the exit surface of the prism. One or both of these angles will thus be different than the Brewster angle and is preferably larger than the Brewster angle. An antireflective coating is preferably provided at one or both of the entrance and exit surfaces to minimize reflective losses. In a preferred embodiment, one or both of the entrance and exit angles is greater than 65°. The relationship between the entrance and exit angles is preferably selected, also according to a selected apex angle of the prism, for maximizing the dispersion of the prism.

In a second aspect of the invention, also in accord with the above object, a laser is provided, preferably an excimer or molecular fluorine laser, having a line-narrowing resonator including a dispersive prism, wherein the apex angle is larger than a prism wherein the apex angle is such that the angle of incidence of a beam at the entrance surface and the exit angle of the beam at the exit surface are each equal to Brewster's angle. The apex angle is preferably greater than 65°, and may be greater than 75°. An antireflective coating is provided on one or both of the entrance and exit surfaces of the prism to minimize reflective losses.

The prisms preferably comprise $CaF_2$, especially when the invention is incorporated with an ArF (193 nm) or $F_2$ (157 nm) laser. One or more beam expanding prisms may be positioned in front of the dispersive prism. These beam expansion prisms have preferred apex angles between 37.5° and 42.5°, and more preferably greater than 40°. The preferred beam expansion prisms also have an antireflective coating on one or both of beam entrance and exit surfaces.

INCORPORATION BY REFERENCE

What follows is a cite list of references each of which is, in addition to those references cited above in the priority section, hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

(1) U.S. Pat. No. 5,761,236 to Kleinschmidt et al.

(2) Yu. G. Bassov: "Telescopic and dispersive prism devices for laser technology:, J. Opt. Technol. 62(3), March 1995

(3) U.Stamm et al.: "ArF Excimer laser for 193 nm Lithography", paper presented at SPIE's 22$^{nd}$ Annual Int. Symp. On Microlithography, 9–14 March 1997, Santa Clara, Calif., USA (SPIE volume 3051-42)

(4) W. Demtröder: "Laser Spectroscopy", Springer Series in Chemical Physics 5, Springer-Verlag Belin, Heidelberg, New York 1981, pages 128 and 277

(5) E. Hecht: "Optics", 2$^{nd}$ edition, Addison-Wesley Publishing Company, 1987, page 164

(6) U.S. Pat. No. 5,898,725 to I. G. Fomenkov et al.

U.S. patent applications Ser. Nos. 09/317,527, 09/343, 333, 09/453,670, 09/447,882, 09/317,695, 09/574,921, 09/559,130, 60/122,145, 60/140,531, 60/140,530, 60/162, 735, 60/166,952, 60/171,172, 09/453,670, 60/184,705, 60/128,227, 09/584,420, 60/141,678, 60/173,993, 60/166, 967, 60/172,674, 60/162,845, 60/160,182, 60/127,237, 09/535,276, 09/247,887, 60/181,156, 60/149,392, 60/198, 058, 09/390,146, 09/131,580, 09/432,348, 60/204,095, 09/172,805, 60/172,749, 60/166,952, 60/178,620, 09/416, 344, 60/186,003, 60/158,808, 09/484,818, 09/317,526, 60/124,785, 09/418,052, 09/379,034, 60/171,717, 60/159, 525, 09/513,025, 60/124,785, 60/160,126, 09/418,052, and 60/186,096, and U.S. Pat. Nos. 6,005,880, 6,014,206, 4,393, 405, 4,977,573, 4,905,243, 5,729,565, 4,860,300, 6,020,723, 5,396,514, each of which is assigned to the same assignee as the present application; and U.S. Pat. Nos. 5,901,163, 5,978, 406, 6,014,398, 6,028,880, 5,559,584, 5,221,823, 5,763,855, 5,811,753, 4,616,908, 4,691,322, 5,535,233, 5,557,629, 5,337,330, 5,818,865, 5,991,324, 5,982,800, 5,982,795, 5,940,421, 5,914,974, 5,949,806, 5,936,988, 6,028,872, 5,729,562, 5,978,391, 5,450,207, 4,926,428, 5,748,346, 5,025,445, and 5,978,394.

DETAILED DESCRIPTION OF THE PREFERRED EMBODIMENTS

The preferred embodiments are particularly advantageous for use with excimer and molecular fluorine laser systems including KrF and ArF excimer lasers. However, other laser systems having line-narrowing components may benefit from features of the prefered embodiments including line-narrowed dye, Ti:Sapphire, and Cr:LiSAF laser systems.

Figure 1A:
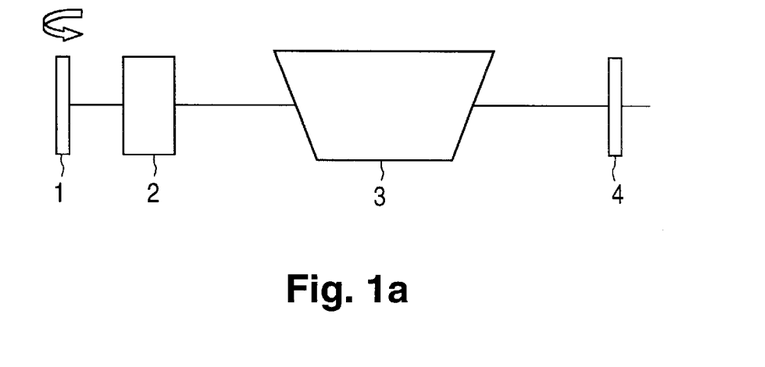
FIG. 1a shows a first embodiment of a line-narrowing laser resonator.
Figure 1B:
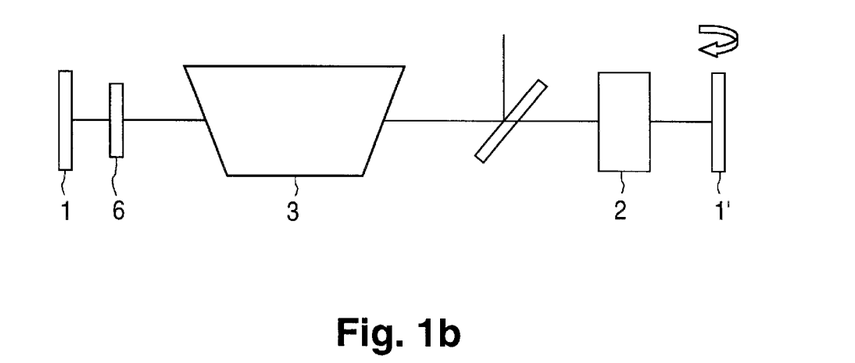
FIG. 1b shows a second embodiment of a line-narrowing laser resonator.

FIGS. 1a and 1b show a first and a second preferred embodiments of a $F_2$-laser resonator in accord with the present invention. It is understood that the overall $F_2$-laser system includes other components in addition to those shown at FIGS. 1a–1b, for providing an output beam with high energy stability and high wavelength and bandwidth stabilities. For example, the preferred $F_2$-laser system includes a power supply and a solid-state pulser module for energizing the laser gas filling the discharge chamber 3.

In addition, a gas handling and supply module is included for controlling the composition of gases in the laser chamber 3. A diagnostic module is further included for monitoring the energy of the laser pulses or the energy dose or moving average of the energies of the laser pulses, and for monitoring the wavelength and/or bandwidth of the beam. The diagnostic module may be used to monitor a parameter that is indicative of the concentration of molecular fluorine in the laser chamber, such that a processor can be used in a feedback arrangement with the gas handling module to maintain a desired gas mixture composition.

The processor is also used to control the power supply such that selected voltages are applied to the main laser electrodes (not shown) and preionization electrodes (not shown). An optics control module adjusts optics of the laser resonator for wavelength and/or bandwidth tuning, e.g., in a feedback arrangement with the processor and diagnostic module. The processor also preferably communicates with an interface unit of an imaging system and/or stepper/scanner module control computer or computers.

A general description of the line-narrowing optics that may be used in the preferred embodiment, or alternatives and/or variations of elements or features thereof, is provided here. Line-narrowing optics may be provided on either side of the discharge chamber 3, and may include, e.g., one or more of a beam expander, one or more etalons, a diffraction grating and/or a birefringent plate, for use with a line-narrowed $F_2$-laser such as is used with a refractive or catadioptric optical lithography imaging system, or with an all-reflective imaging system. The line-narrowing package may include a beam expander and one or more etalons followed by an HR mirror as a resonator reflector.

One or more apertures may be included in the resonator for blocking stray light and matching and/or reducing the divergence of the resonator. As mentioned above, the line-narrowing optics may be provided on the output coupling side of the laser chamber 3 (see the Ser. No. 60/166,277, 60/173,993 and 60/166,967 applications, each being assigned to the same assignee and hereby incorporated by reference), including or in addition to the outcoupler element.

A beam expander of the line-narrowing optics preferably includes one or more prisms. The beam expander may include other beam expanding optics such as a lens assembly or a converging/diverging lens pair. A grating, etalon or etalons or highly reflective mirror may be rotatable so that the wavelengths propagating within the acceptance angle of the resonator can be selected or tuned. Alternatively, the grating, etalon or etalons, or other optic or optics, or the entire line-narrowing module may be pressure tuned, such as is set forth in the Ser. Nos. 60/1 78,445 and 09/317,527 applications, each of which is assigned to the same assignee and is hereby incorporated by reference. When a grating is used, it is preferred to use an amplifier after the laser oscillator to increase the power of the beam. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, and 5,946,337, and U.S. patent applications Ser. No. 09/317,695, 09/130,277, 09/244,554, 09/317,527, 09/073,070, 60/124,241, 60/140,532, 60/147,219 and 60/140,531, 60/147,219, 60/170,342, 60/172,749, 60/178,620, 60/173,993, 60/166,277, 60/166,967, 60/167,835, 60/170,919, 60/186,096, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application.

In all of the above and below embodiments, the material used for the prisms of the beam expanders, etalons, laser windows and the outcoupler is preferably one that is highly transparent at wavelengths below 200 nm, such as at the 157 nm output emission wavlength of the molecular fluorine laser. The materials are also capable of withstanding long-term exposure to ultraviolet light with minimal degradation effects. Examples of such materials are CaF2, MgF2, BaF, BaF2, LiF, LiF2, and SrF2, and in some cases quartz or fluorine-doped quartz may be used. Also, in all of the embodiments, many optical surfaces, particularly those of the prisms, preferably have an anti-reflective coating on one or more optical surfaces, in order to minimize reflection losses and prolong their lifetime. A highly reflective dielectric coating may be used on surfaces wherein it is desired to have a high degree of reflection, e.g., a highly reflective resonator reflector or internal surfaces of an etalon.

A line-narrowed oscillator, e.g., a set forth above, may be followed by a power amplifier for increasing the power of the beam output by the oscillator. Preferred features of the oscillator-amplifier set-up are set forth at U.S. patent application Ser. Nos. 09/559,130, which is assigned to the same assignee and is hereby incorporated by reference. The amplifier may be the same or a separate discharge chamber. An optical or electrical delay may be used to time the electrical discharge at the amplifier with the reaching of the optical pulse from the oscillator at the amplifier.

An excimer or molecular fluorine laser resonator is shown schematically in FIG. 1a including a highly reflecting mirror 1 which can be tilted for wavelength tuning, a prism unit 2 consisting of one prism or several prisms, a laser chamber 3 containing the active medium and an outcoupling mirror 4. Alternative resonator concepts make use of polarization coupling as illustrated in FIG. 1b where the outcoupling is realized by the polarizing beam splitter 5 in connection with the polarization rotator 6 (see detailed description in Ref. 1).

Other possible embodiments are described in the patent of Kleinschmidt et al. (Ref. 1, above, U.S. Pat. No. 5,761,236). In the '236 patent, prisms of special material compositions, wherein at least one prism is made of a material having another sign of the temperature coefficient of the refractive index than that of the material of the other prism(s), e.g., fused silica and $CaF_2$, are used, wherein one of the prisms can have incident and exiting rays with angles not equal to Brewster's angle, which is around 56°. In this manner, one may advantageously achieve a temperature independent total angle of deflection.

Due to lower losses and higher resistance against light induced changes of $CaF_2$ in caparison to fused silica it is advantageous to use only prisms made of $CaF_2$ when operating at 193 nm. This is explained in Reference 3, above, in more detail. $CaF_2$ is advantageous also at 248 nm, see Reference 6, above, as well as at 157 nm.

Figure 2:
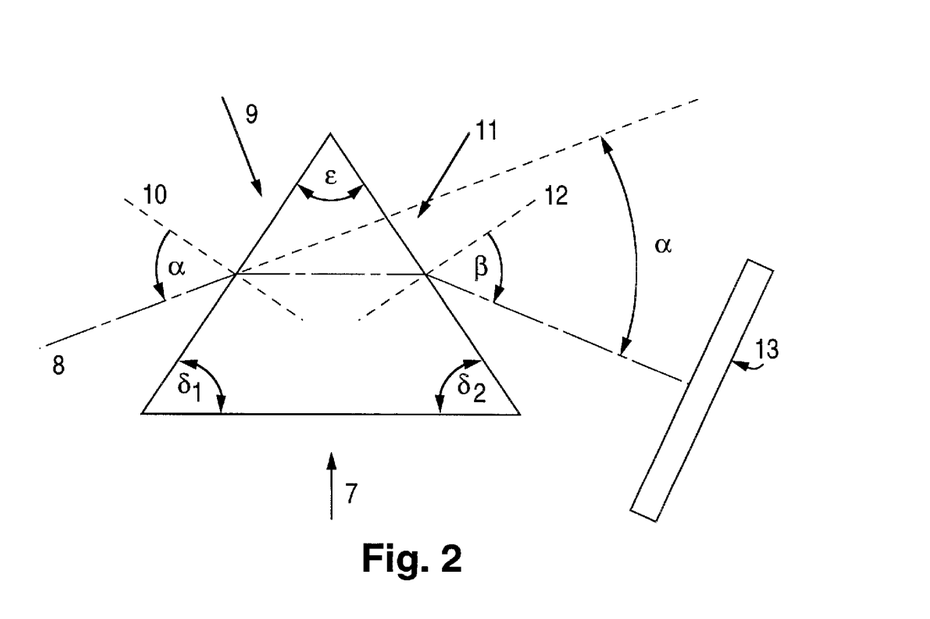
FIG. 2 schematically illustrates a laser beam path through a preferred dispersive prism and angles associated with the prism and the beam path.

FIG. 2 depicts one possible embodiment of the disclosed line narrowing unit. This embodiment consists of one beam dispersive prism 7 and a highly reflective mirror 13. The dispersive prism can be made of a number of materials that are substantially transparent at the emission wavelength of the eximer or molecular fluorine laser. Some examples of such materials are $CaF_2$, $BaF_2$, $SrF_2$, $MgF_2$, $LiF_2$, LiF, quartz and fluorine-doped quartz. In the disclosed preferred embodiment, dispersive prism 7 is constructed of $CaF_2$.

Dispersive prism 7 has beam 8 entering through entrance surface 9. The incidence angle $\alpha$ at which beam 8 enters entrance surface 9 is measured relative to dotted line 10 (shown merely for illustrative purposes) which is normal to the entrance face 9 of the prism 7. Beam 8 passes through dispersive prism 7 and exits through exit surface 11. The beam's exit angle $\beta$ is measured in the same manner as the incidence angle $\alpha$, i.e., from a normal to the exit surface 11. Dispersive prism 7 also has an apex angle $\epsilon$ which is the angle formed at the intersection of entrance surface 9 and exit surface 11. The angle between the incidence angle $\alpha$ and the exit angle $\beta$ in absolute space is denoted by $\gamma$.

The entrance angle $\alpha$, exit angle $\beta$ and apex angle $\epsilon$ are each selected to achieve an appropriate degree of line narrowing.

Furthermore, it is desirable to limit the losses that occur in the line narrowing unit. Reduced losses are advantageous, especially when utilizing lasers with high pulse repetition rates, e.g., of 1–2 kHz or more. One possible way to limit losses is to limit the number of dispersive prisms by maximizing the dispersion of each prism used.

To calculate advantageous prism angles, i.e., $\alpha$, $\beta$, $\epsilon$ and $\gamma$, for maximizing dispersion and/or minimizing the number of prisms, the following calculations are performed using a number of useful formulas. The angles used in the formulas are the various angles shown in FIG. 2. The passive bandwidth $\Delta\lambda$ that may be achieved by a prism, without considering roundtrips through the laser cavity is:

$$\Delta\lambda = \left(\frac{d\lambda}{d\gamma}\right) \cdot d\theta \qquad (1)$$

where $d\lambda/d\gamma$ is the inverse of the angular dispersion and $d\theta$ is the beam spread (beam divergence). The usual way of decreasing the beam divergence by a factor of M is the use of one or more beam expanding prisms. For a beam expanding prism with a refractive index of n=1.5, (which is approximately the refractive index of $CaF_2$ at 193 nm) and an angle of incidence at the entrance surface of the beam expanding prism near Brewster's angle (about 56°), the expansion ratio can be increased up to about 2.5.

The other way to decrease the beam divergence is to increase the angular dispersion $d\gamma/d\lambda$. The angular dispersion may be described as:

$$\frac{\gamma}{d\lambda} = \frac{d\gamma}{dn} \cdot \frac{dn}{d\lambda} \qquad (2)$$

The material dispersion $dn/d\lambda$ is determined by the type of material used to construct the prism. As discussed above, in the preferred embodiment, $CaF_2$ is used to construct the dispersive prism. The value of $dn/d\lambda$ for the preferred prism is $-1.0\ \mu m^{-1}$.

Therefore, an analysis is now performed of the first term on the right hand side of equation 2, the derivative of the angle of deviation $\gamma$ with respect to the index of refraction of the prism n. As discussed above, a conventional arrangement of a dispersive prism within a laser resonator has the prism entrance surface oriented at Brewster's angle to minimize losses for the p-polarized component of light which is the oscillating polarization component in the laser. In that case, $d\gamma/dn \approx 2$ (for a single-pass) and $d\gamma/dn \approx 4$ (for a double-pass after reflection by a resonator reflector surface), wherein the prism is passed in a symmetric manner, i.e., the incidence angle $\alpha$ is equal to the exit angle $\beta$. In the case of this symmetrical arrangement ($\alpha=\beta$) the deviation $\gamma$ has a minimum. This special case is used for certain applications like accurate determination of refractive indices or minimizing the prism material in spectrographs. Advantageously, in accord with the preferred embodiment, $d\gamma/dn$ is maximized in order to increase dispersion thus creating stronger spectral narrowing for a given number of prisms within a laser resonator.

The deviation angle $\gamma$ of a prism is described as:

$$\gamma = \alpha + \arcsin[\sin\epsilon\sqrt{n^2 - \sin^2\alpha} - \sin\alpha\cdot\cos\epsilon] - \epsilon \qquad (3)$$

The derivative of the above equation with respect to n gives:

$$\frac{d\gamma}{dn} = \frac{n \cdot \sin\varepsilon}{\sqrt{n^2 - \sin^2\alpha} \cdot \sqrt{1 - \left[\cos\varepsilon \cdot \sin\alpha - \sin\varepsilon\sqrt{n^2 - \sin^2\alpha}\right]^2}} \qquad (4)$$

For the special case of symmetrical pass through a Brewster prism $d\gamma/dn=2$ (for a single-pass) and $d\gamma/dn=4$ (for a double-pass after reflection by the mirror), as mentioned above. For $CaF_2$ and $\gamma=193$ nm (i.e., n=1.501) this arrangement corresponds to $\alpha=\beta=56.3°$ and the apex angle of the prism $\epsilon=67.3°$.

For this Brewster prism, the other prism angles (see FIG. 2) are $\delta_1=\delta^2=\alpha$. The advantage of Brewster's angle is that there are no reflection losses for p-polarized light. However, advantageously, in accord with the preferred embodiment, an antireflective coating may be applied to the entrance and/or exit surface to minimize reflection losses, which allows the use of angles of incidence $\alpha$ that may be higher than Brewster's angle with losses of less than 0.5%. For the material used in the preferred embodiment of $CaF_2$ and a laser wavelength of 193 nm, antireflective coatings can be manufactured that allow negligible losses for angles of incidence $\alpha$ higher than Brewster's angle, and preferably higher than 65°, and even as high as 72–75° or more, depending on the coating used.

For this reason, the above equation as investigated for a double pass with incidence and exit angles ($\alpha$ and $\beta$) of up to 72°, i.e., $\alpha_{MAX}=72°$, $\beta_{MAX}=72°$. The angle $\beta$ was calculated according to:

$$\beta = \arcsin[\sin\epsilon\cdot\sqrt{n^2-\sin^2\alpha}] - \sin\alpha\cdot\cos\epsilon \qquad (5)$$

For the return pass, $\alpha$ and $\beta$ are switched.

Figure 3:
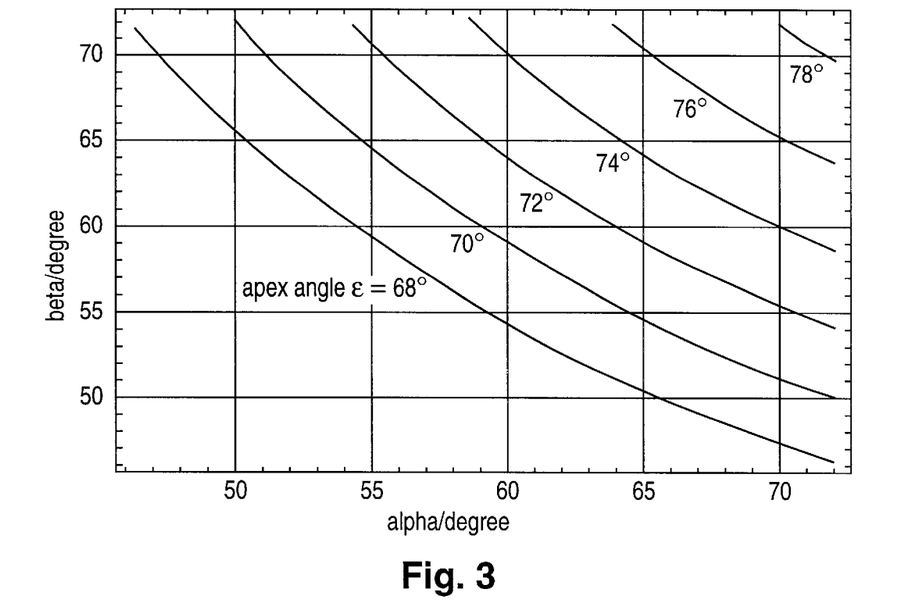
FIG. 3 shows several plots of beam exit angle as a function of beam entrance angle through a dispersive prism for several apex angles of the prism.

FIG. 3 shows the exit angle $\beta$ calculated as a function of the entrance angle $\alpha$ for different apex angles $\epsilon$. The material used is $CaF_2$ with a wavelength of 193 nm. The higher the apex angle the smaller the range which is possible for $\alpha$ and $\beta$.

Figure 4:
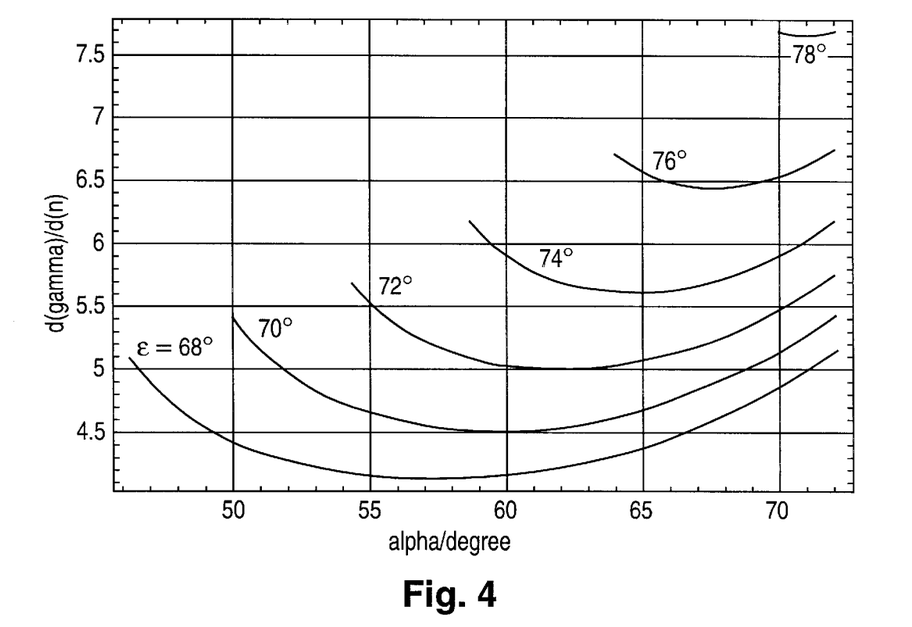
FIG. 4 illustrates dγ/dn (from which the angular dispersion of a diespersive prism depends) versus beam entrance angle into the prism for several apex angles of the prism.
Figure 5:
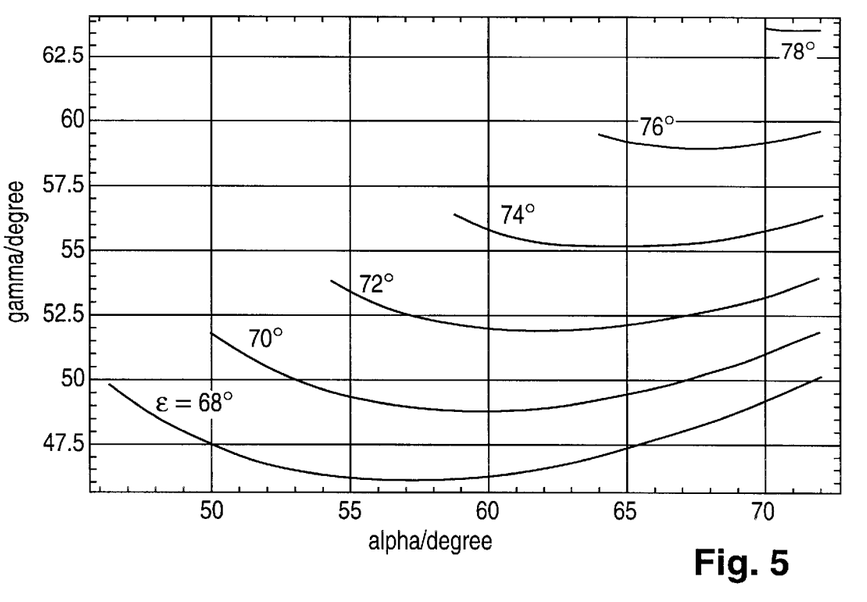
FIG. 5 shows angular deviation versus beam entrance angle for several apex angles of a dispersive prism.

The functional dependence of $d\gamma/dn$ in the above equation calculated with $\alpha_{max}=72°$, $\beta_{max}=72°$ is shown in FIG. 4, again for various apex angles $\epsilon$. The data shows that for a given apex angle $\epsilon$, the maximum dispersion is not at the symmetric pass where the deviation angle $\gamma$ has its minimum. The deviation angle $\gamma$ versus incidence angle $\alpha$ is shown in FIG. 5, again for various apex angles $\epsilon$. Furthermore, the higher the apex angle $\epsilon$, the higher the dispersion $d\gamma/d\lambda$. At the values of $\alpha_{max}$ and $\beta_{max}$, the maximum apex angle $\epsilon_{max}$ is about 78°.

From these results, two advantages of the preferred embodiment are shown in the data. First, the prism dispersion $d\gamma/d\lambda$ may be increased by using a non-symmetric pass, e.g., wherein one of the incidence and exit angles $\alpha$, $\beta$, is greater than Brewster's angle and the other is around Brewster's angle or higher, but different than the other of the entrance and exit angles $\alpha$, $\beta$. For a prism having an exit angle $\beta$ at Brewster's angle and an incidence angle $\alpha$ that is increased from Brewster's angle due to the apex angle $\epsilon$ being larger than that for a conventional Brewster prism, the dispersion $d\gamma/d\lambda$ increases with apex angle $\epsilon$. The rate of increase of the dispersion $d\gamma/d\lambda$ with increasing apex angle $\epsilon$, however, decreases as the apex angle $\epsilon$ is increased. For an apex angle $\epsilon=68°$, the increase in dispersion $d\gamma/d\lambda$ is about 25% over a symmetrical pass Brewster prism, and at an apex angle $\epsilon=74°$, the increase in dispersion $d\gamma/d\lambda$ is about 10% more. Second, the prism dispersion $d\gamma/d\lambda$ increases with increasing apex angle $\epsilon$. Using low loss anti-reflective coatings, the apex angle $\epsilon$ may be advantageously increased up to at least approximately 78°.

Figure 6:
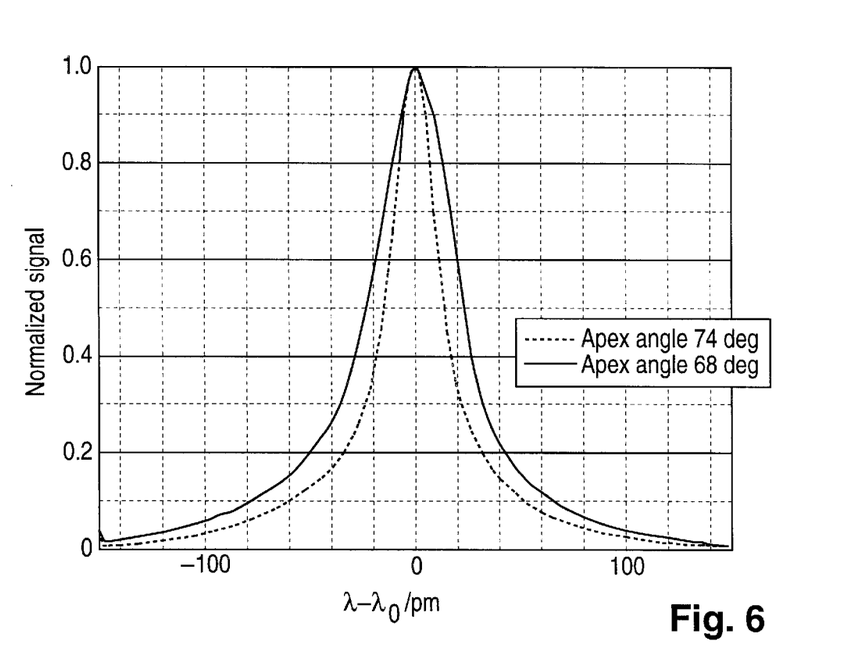
FIG. 6 illustrates bandwidth narrowing of a laser beam using dispersive prisms having apex angles of 68° and 74°.

FIG. 6 shows normalized spectra calculated for two different dispersion prisms having apex angles $\epsilon$ of 68° and 74°, wherein the prism having an apex angle $\epsilon$ of 74° produces a narrower bandwidth due to its higher dispersion $d\gamma/d\lambda$ than the prism having an apex angle of 68°.

Thus, in accord with the preferred embodiment where one of the incidence and exit angles is increased above Brewster's angle while the other angle is maintained at Brewster's angle or is also increased, the dispersion $d\gamma/d\lambda$ can be advantageously increased in comparison to a conventional dispersion prism using a symmetrical pass at Brewster's angles by nearly a factor of 2. That is, the passive bandwidth is nearly half, in comparison to the conventional arrangement.

Referring in summary back to the embodiment shown in FIG. 2, the beam 8 makes a non-symmetric pass through dispersive prism 7. Preferably, the incidence angle α of the beam at the entrance surface 9 of the prism 7 is greater than Brewster's angle (around 56°), and is specifically preferably greater than 65° up to around 72°. The apex angle ε is preferably chosen to be greater than 65°, and may be greater than 75° up to around 78°. The exit angle is preferably also greater than Brewster's angle and is specifically preferably greater than 65° up to around 72°. The dispersive prism 7 is preferably constructed of $CaF_2$ and entrance and exit surfaces 9 and 11, respectively, are each coated with an antireflective coating.

Figure 7:
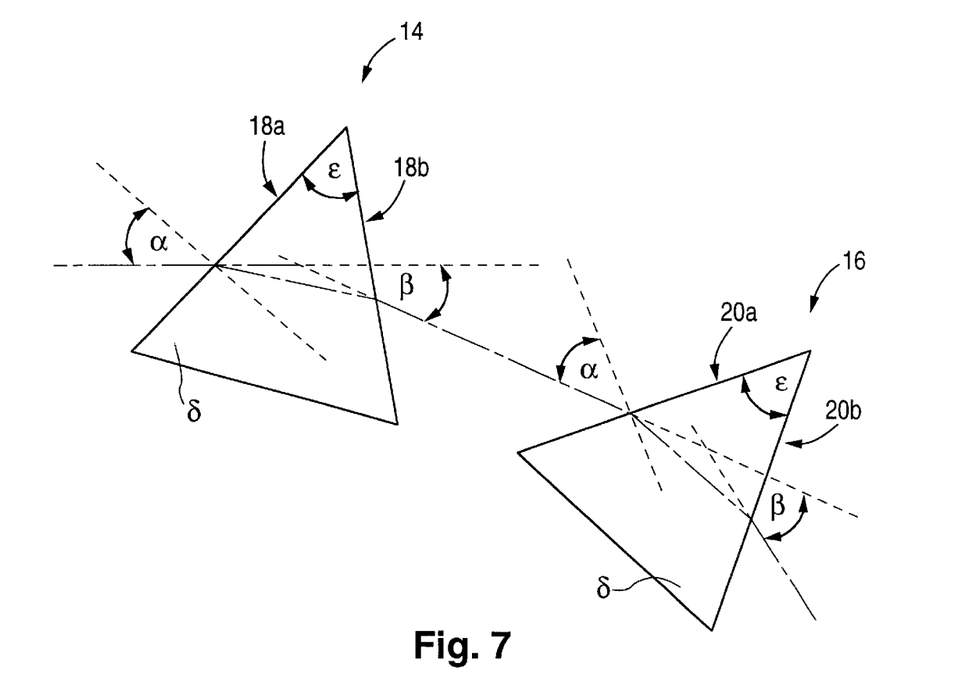
FIG. 7 schematically shows a pair of dispersive prisms that may be used for line-narrowing of a laser beam.

Another preferred embodiment of the invention is illustrated at FIG. 7. This preferred embodiment shows two dispersive prisms, dispersive prism 14 and dispersive prism 16. Preferably, both prisms 14 and 16 are constructed of $CaF_2$ and the entrance and exit surfaces 18a, 18b and 20a, 20b, respectively for the two prisms 14 and 16, are coated with antireflective coatings. This embodiment allows even greater line narrowing than with the single dispersive prism embodiment shown in FIG. 2, although somewhat greater losses are expected owing to the additional prism. The angles α, β, δ, ε for each of the prisms 14 and 16 are chosen to maximize their dispersion dγ/dλ and are thus in accord with the preferred angles described above with respect to the embodiment shown and described with respect to FIG. 2.

Figure 8:
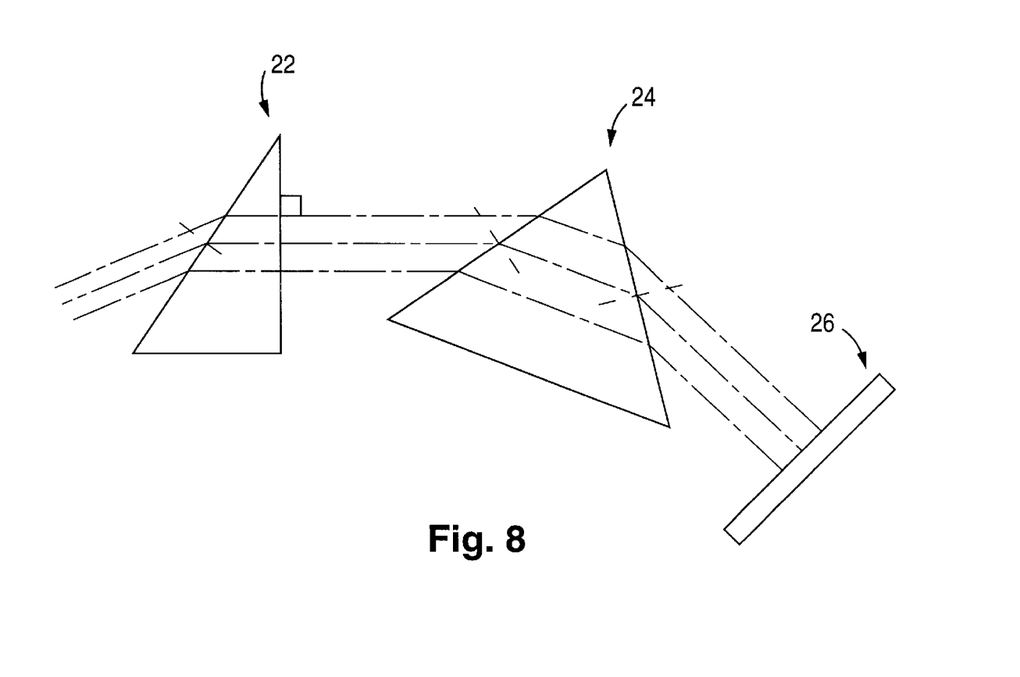
FIG. 8 schematically shows a beam expansion prism before a dispersion prism and a highly reflective mirror or grating for line-narrowing a laser beam.

FIG. 8 shows an embodiment of the invention that includes a beam expanding prism 22 before a dispersive prism 24 and a highly reflective mirror 26. The beam expanding prism 22 is disposed before the dispersive prism 8 for reducing the divergence dθ before the beam is incident at the dispersive prism 24.

Figure 9:
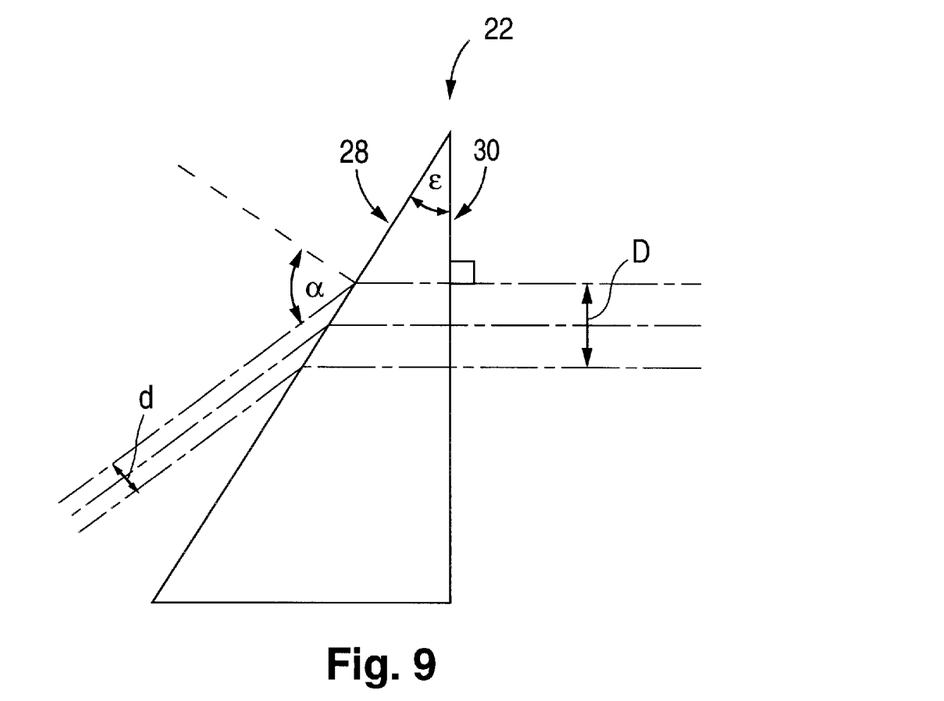
FIG. 9 shows an expanded view of the beam expansion prism of FIG. 8.

FIG. 9 shows an expanded view of the beam expanding prism. The beam expanding prism 22 expands the beam by a factor M=D/d. Preferably, the beam expanding prism 22 illustrated schematically at FIG. 9 is made of $CaF_2$ and is coated with an anti-reflective coating at its entrance and exit surfaces 28 and 30. The beam is incident at the entrance surface 28 of the beam expanding prism 22 at an angle of incidence α preferably between around 65° and 75°, or higher, depending on the geometry of the wavelength selective component following the prism 22. A specifically specifically preferred incidence angle is around 72°. The apex angle ε formed by the intersection of the entrance and exit surfaces 28 and 30 preferably between around 37.5° and 42.5° and preferably about 40° to maximize the beam expansion of the prism 22. The apex and incidence angles ε and α are preferably chosen together to maximize beam expansion, as shown below. The beam preferably exits the prism 22 at or near normal to the exit surface 30 of the prism 22. The apex angle ε of the prism 22 and the angle of incidence α of the beam at the entrance surface 28 of the prism 22 are thus selected in combination to maximize the beam expansion properties of the prism 22.

Figure 10:
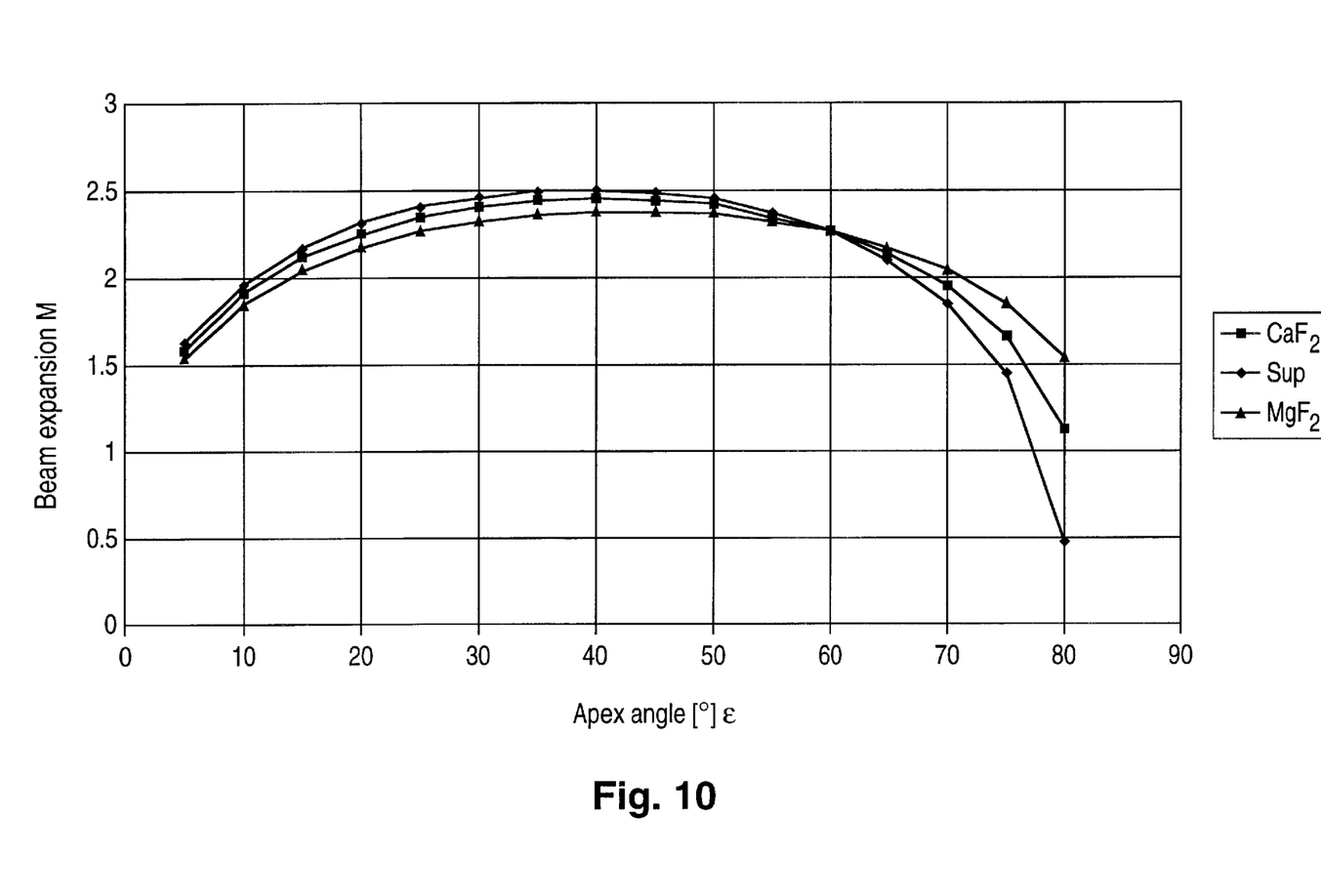
FIG. 10 shows plots of beam expansion versus apex angle for a beam expansion prism for selected prism materials.

FIG. 10 shows the beam expansion M of the prism 22 versus apex angle ε at an angle of incidence of 72° for prism materials $CaF_2$, quartz (suprasil) and $MgF_2$. FIG. 10 shows that the maximum beam expansion is around 40° for each prism material. Since maximum beam expansion is advantageous, the apex angle of the beam expanding prism in the preferred embodiment is around 40°, as mentioned above.

Figure 11:
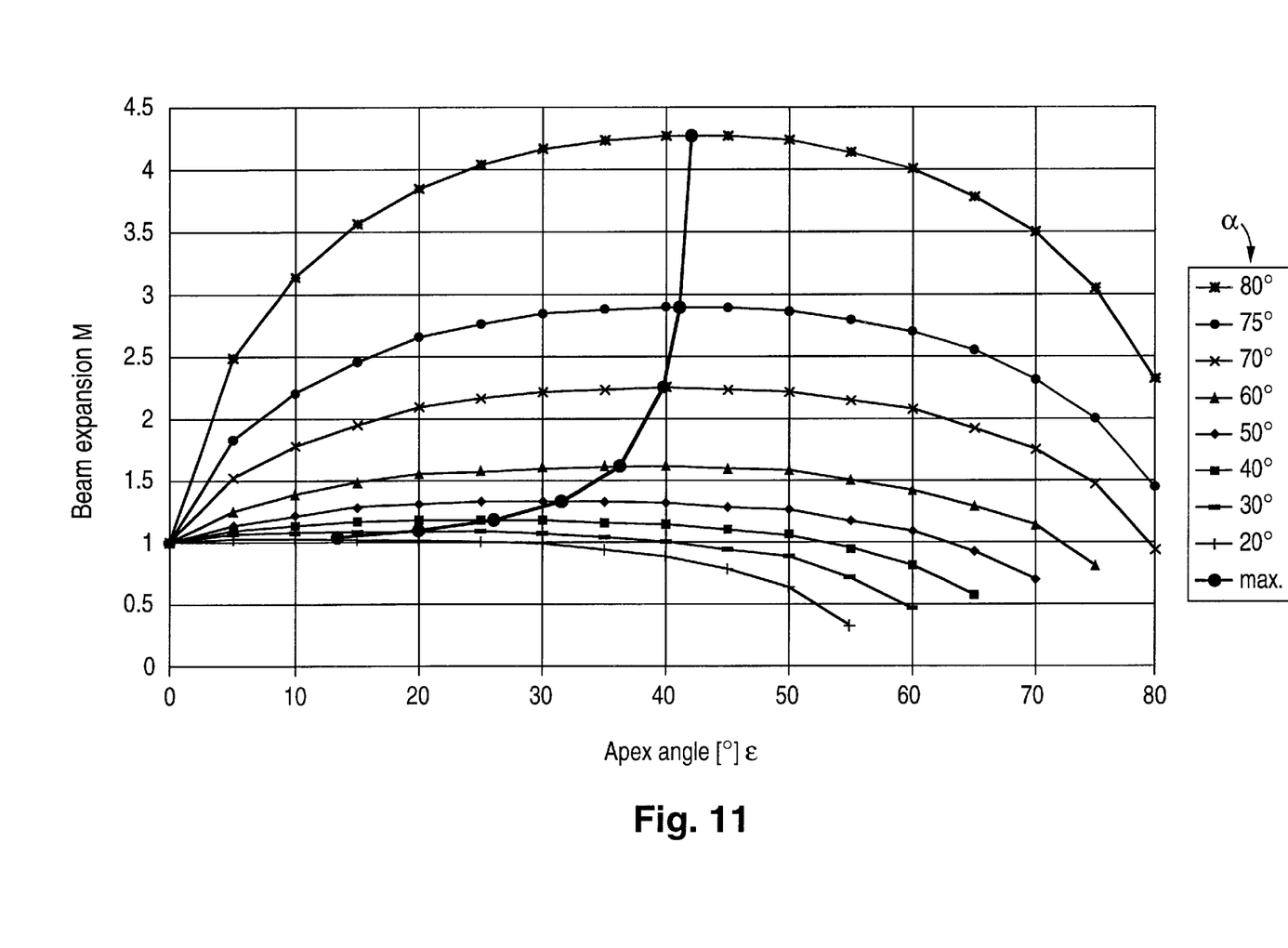
FIG. 11 shows plots of beam expansion versus apex angle for a beam expansion prism for several incidence angles of a beam at the entrance surface of the prism.

FIG. 11 shows the beam expansion M of the prism 22 versus apex angle α for various angles of incidence α. At larger incidence angles ε, greater beam expansion is shown and the optimal apex angle ε increases. For an incidence angle α of around 72°, the apex angle ε is preferably around 40°, as mentioned above.

Figure 12:
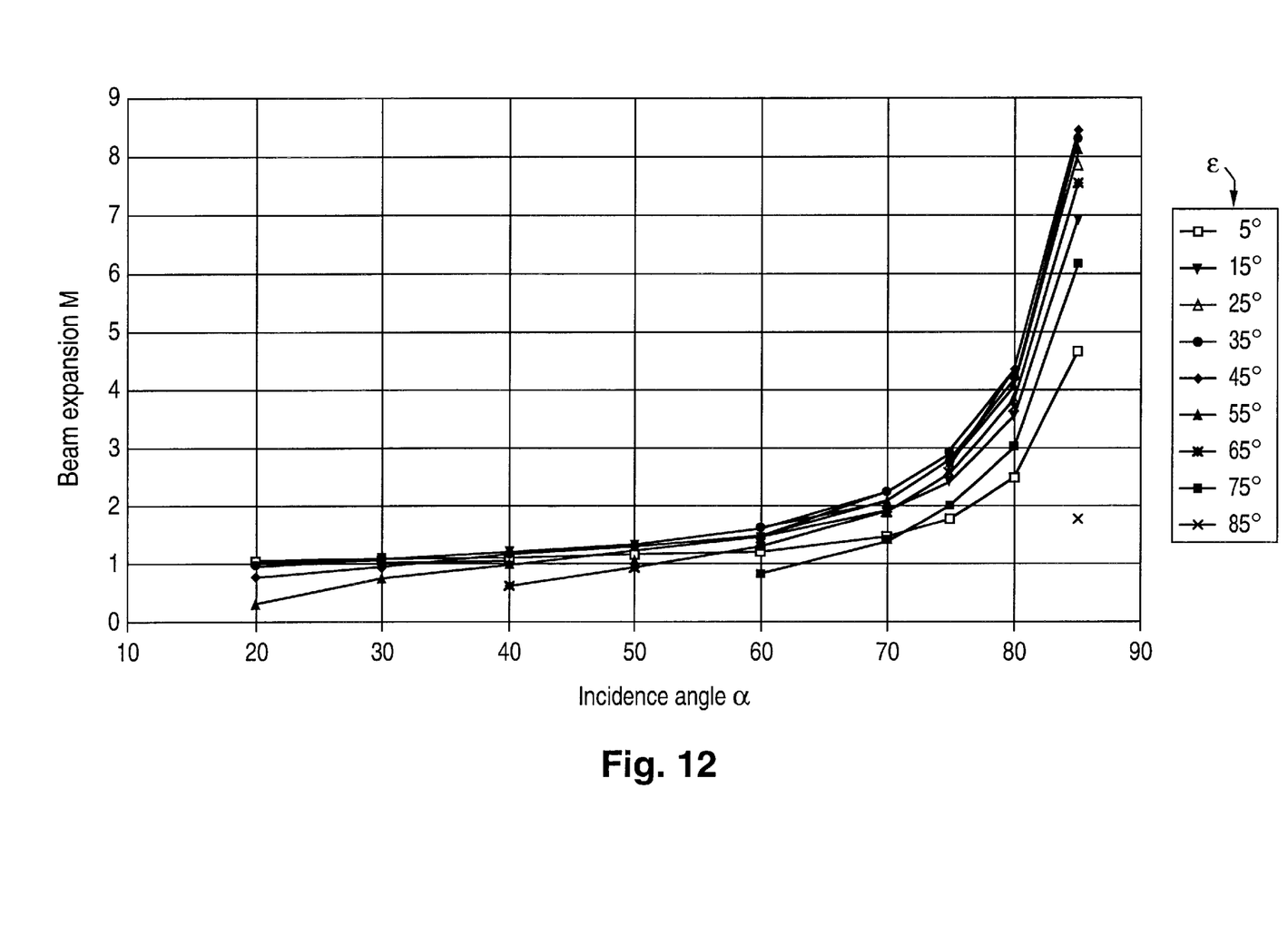
FIG. 12 shows plots of beam expansion versus incidence angle for beam expansion prisms having various apex angles.

FIG. 12 shows beam expansion M versus angle of incidence a or several apex angles ε. Beam expansion M is shown here as increasing with both incidence angle α and apex angle ε.

Figure 13:
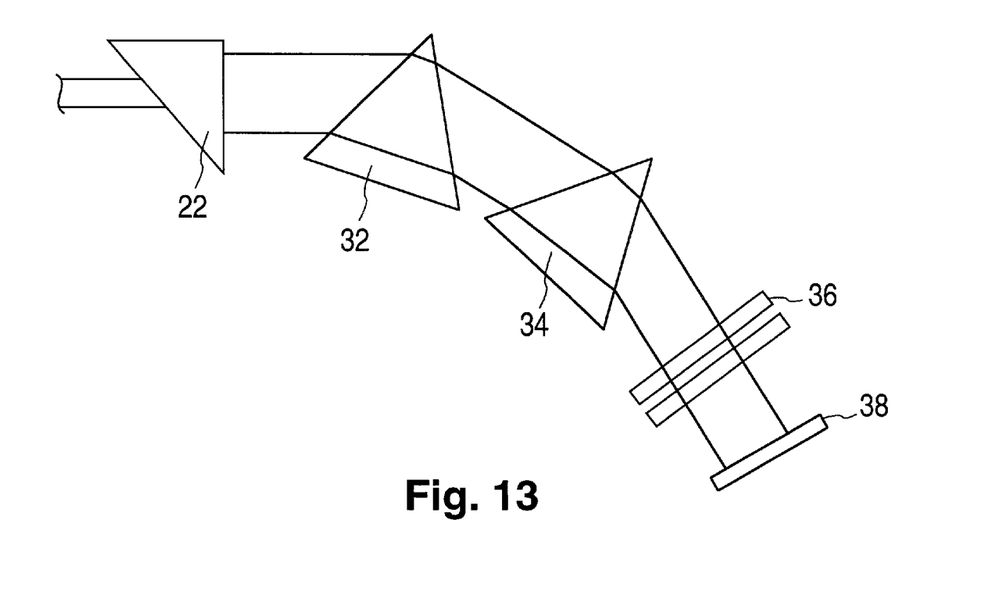
FIG. 13 shows an alternative line-narrowing resonator embodiment, including a beam expansion prism, a pair of dispersive prisms, an etalon and a highly reflective mirror or grating, which illustrates that a variety of resonator configurations are possible using a variety of line-narrowing optical components in accord with the present invention.

FIG. 13 shows another embodiment of the invention to illustrate that several resonator configurations may be used in accord with the invention using any of a variety of combinations of line-narrowing optical elements such as beam expansion prisms, dispersive prisms, etalons, birefringent plates or interference blocks, grisms and gratings, and other elements known to those skilled in the art. When one or more beam expansion and/or dispersive prisms are included in the resonator configuration, then dispersive efficiency and limitation of optical losses in the resonator may be advantageously improved in accord with the preferred embodiments of the beam expansion prisms and dispersive prisms described above.

The embodiment of FIG. 13 specifically shows a beam expanding prism 22 before a pair of dispersive prisms 32 and 34, followed by an etalon 36 and a highly reflective mirror 38. The preferred beam expanding prism 22 and the dispersive prisms 32 and 34 have been described above. A grating may be used in place of the mirror 38 for high dispersion. A second beam expanding prism my be positioned adjacent the prism 22, the dispersive prisms 34 and 36 removed, and an additional beam expanding prism positioned between either the first two beam expander prisms and the etalon or between the etalon and the grating. A total of three or four beam expansion prisms may be used in front of a grating and/or etalon. More than one etalon may be used. Thee may be line-narrowing elements on the other side of the discharge chamber (not shown) of the excimer or molecular fluorine laser system, e.g., line-narrowing outcouplers such as gratings, grisms, etalons, birefringent plates or interference blocks, or prisms.

The following values are preferred for various parameters of an embodiment including two beam expansion prisms and two dispersive prisms before a highly reflective mirror for a line-narrowed KrF-excimer laser system emitting around 248 nm. The beam expansion M generated by the two beam expansion prisms is around M=5. The material of all prisms is $CaF_2$ (n=1.468 at 248 nm). The dispersive prisms differ in their apex angles. The preferred apex angle ε for the first dispersive prism is around ε=69°, and for the second dispersive prism the apex angle ε is around ε=74°. The angles of incidence α are preferably slightly different, e.g., for prism A: α=56°, and for prism B: α=60°). The calculated reduction of the passive bandwidth when using prism B and not prism A is 1.33. The measured reduction of laser bandwidth in this case is 1.65. The difference is understood as due to the fact that the measured laser bandwidth is the mean value of several roundtrips, and, as mentioned, our calculation assumed no roundtrips in the resonator.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

What is claimed is:

1. A line narrowing unit for use within an excimer or molecular fluorine laser resonator for generating a line-narrowed DUV/VUV laser beam, comprising:
   a dispersive prism including a bulk material which is substantially transparent at an emission wavelength of said laser system, said prism being arranged at a particular orientation within said resonator for dispersing the beam such that only a selected portion of the spectral bandwidth of the beam remains within an acceptance angle of said resonator and other unselected portions are dispersed outside of the acceptance angle of said resonator,
   wherein said prism includes an entrance surface at which a laser beam is incident and refracted into the bulk material, and an exit surface at which said beam exits and refracts out of said bulk material, and
   wherein said beam makes a non-symmetric pass through said prism, such that an entrance angle of said beam at said entrance surface of said prism differs from an exit angle of said beam at said exit surface of said prism, and one of said entrance and exit angles is greater than Brewster's angle and the other is at least around Brewster's angle.

2. The line-narrowing unit of claim 1, wherein said entrance angle is greater than Brewster's angle.

3. The line-narrowing unit of claim 1, wherein said exit angle is greater than Brewster's angle.

4. The line-narrowing unit of claim 3, wherein said entrance angle is greater than Brewster's angle.

5. The line-narrowing unit of claim 3, wherein said exit angle is greater than 65°.

6. The line-narrowing unit of any of claims 2 or 4–5, wherein said entrance angle is greater than 65°.

7. The line-narrowing unit of any of claims 2–4, wherein an apex angle between said entrance and exit surfaces of said prism and said entrance and exit angles of said beam is preselected to be greater than 65° such that said dispersion prism produces an enhanced spectral dispersion of said beam.

8. The line-narrowing unit of claim 1, wherein said bulk material of said prism is selected from the group of materials consisting of $CaF_2$, $BaF_2$, $SrF_2$, $LiF_2$, LiF, $MgF_2$, quartz and fluorine-doped quartz.

9. The line-narrowing unit of claim 1, wherein both of said entrance and exit surfaces of said prism has an antireflective coating formed thereon.

10. The line-narrowing unit of claim 9, wherein a beam expanding prism is disposed before the dispersive prism.

11. The line-narrowing unit of claim 10, further comprising a grating.

12. The line-narrowing unit of claim 10, further comprising an etalon.

13. A line narrowing unit for use with an eximer or molecular fluorine laser system for generating a line-narrowed DUV/VUV laser beam, comprising:
   a dispersive prism including a bulk material which is substantially transparent at an emission wavelength of said excimer or molecular fluorine laser system, said prism being arranged at a particular orientation within said resonator for dispersing the beam such that only a selected portion of the spectral bandwidth of the beam remains within an acceptance angle of said resonator and other unselected portions are dispersed outside of the acceptance angle of said resonator,
   wherein said prism includes an entrance surface at which said beam is incident at an entrance angle and refracted into the bulk material, and an exit surface at which said beam exits at an exit angle and refracts out of said bulk material, and
   wherein an apex angle between said entrance surface and said exit surface of said prism is large enough that at least one of said entrance angle and said exit angle is greater than Brewster's angle, while the other is at least around Brewster's angle.

14. The line-narrowing unit of claim 13, wherein said apex angle is large enough that both of said entrance angle and said exit angle are greater than Brewster's angle.

15. The line-narrowing unit of claim 13, wherein said at least one of said entrance angle and said exit angle is greater than 65°.

16. The line-narrowing unit of claim 13, wherein said apex angle is greater than substantially 65°.

17. The line-narrowing unit of claim 13, wherein said apex angle is greater than substantially 75°.

18. The line-narrowing unit of any of claims 13–17, wherein both surfaces of said prism have an antireflective coating formed thereon.

19. The line-narrowing unit of claim 18, wherein at least one beam expanding prism is disposed before the dispersive prism.

20. The line-narrowing unit of any of claims 19, further comprising a grating.

21. The line-narrowing unit of any of claims 19, further comprising an etalon.

22. A line-narrowing unit for use in an excimer or molecular fluorine laser system for generating a line-narrowed DUV/VUV laser beam, comprising:
   a beam expanding prism made of a bulk material which is substantially transparent at an emission wavelength of said excimer or molecular fluorine laser system, said prism being arranged at a particular orientation within said resonator for expanding the beam such that substantially the entire spectral bandwidth of said beam remains within an acceptance angle of said resonator while a beam divergence is decreased and a geometric cross-sectional axis extent of said beam is increased by passing through said prism; and
   a line selection element arranged within said resonator after said beam expanding prism at a particular orientation such that only a selected portion of the spectral bandwidth of the incident beam remains within an acceptance angle of said resonator after said line selection element,
   wherein said prism includes an entrance surface at which a laser beam is incident and refracted into the bulk material, and an exit surface at which said beam exits substantially normally to said exit surface, and
   wherein the apex angle between said entrance surface and said exit surface of said prism is within a range of apex angles between 37.5° and 42.5°, and a beam incidence angle at said entrance surface is more than 65°.

23. The line narrowing unit of claim 22, wherein the apex angle is between substantially 39.5° and 40.5° and the angle of incidence measured from said entrance surface is between substantially 70° and 73°.

24. The line narrowing unit of claim 22, wherein the angle of incidence measured from said entrance surface is between substantially 67° and 73°.

25. The line narrowing unit of claim 24, wherein the apex angle is between substantially 39° and substantially 41°.

26. The line narrowing unit of any of claims 22–25, wherein at least one surface of the prism has an anti-reflective coating formed thereon.

27. The line narrowing unit of claim 26, wherein said bulk material of said prism is selected from the group of materials consisting of $CaF_2$, $BaF_2$, $SrF_2$, $LiF_2$, LiF, $MgF_2$, quartz and fluorine-doped quartz.

28. The line narrowing unit of claim 22, wherein said bulk material of said prism is selected from the group of materials consisting of $CaF_2$, $BaF_2$, $SrF_2$, $LiF_2$, LiF, $MgF_2$ quartz and fluorine-doped quartz.

29. The line narrowing unit of claim 26, wherein said line-selection element is an optical etalon including a pair of etalon plates each comprising a material which is substantially transparent at an emission wavelength of said excimer or molecular fluorine laser system, said etalon being arranged at a particular orientation within said resonator for selecting a portion of the spectral bandwidth of the beam which remains within the acceptance angle of said resonator and suppressing unselected portions.

30. The line narrowing unit of claim 26, wherein said line-selection element is a dispersion grating arranged at a particular orientation within said resonator for dispersing the beam such that only a selected portion of the spectral bandwidth of the beam remains within an acceptance angle of said resonator and other unselected portions are dispersed outside of the acceptance angle of said resonator.

31. The line-narrowing unit of claim 26, wherein said line-selection element is a dispersion prism including a bulk material which is substantially transparent at an emission wavelength of said excimer or molecular fluorine laser system, said prism being arranged at a particular orientation within said resonator for dispersing the beam such that only a selected portion of the spectral bandwidth of the beam remains within an acceptance angle of said resonator and other unselected portions are dispersed outside of the acceptance angle of said resonator.

32. The line-narrowing unit of claim 31, wherein said dispersion prism includes an entrance surface at which a laser beam is incident and refracted into the bulk material, and an exit surface at which said beam exits and refracts out of said bulk material, and at least one of said entrance and exit surfaces has an antireflective coating formed thereon, and wherein said beam makes a non-symmetric pass through said prism, such that an entrance angle of said beam at said entrance surface of said prism differs from an exit angle of said beam at said exit surface of said prism.

33. The line-narrowing unit of claim 32, wherein said exit angle of said beam from said dispersion prism is greater than 65°.

34. The line-narrowing unit of claim 33, wherein said entrance angle of said beam at said dispersion prism is greater than 65°.

35. The line-narrowing unit of claim 34, wherein an apex angle of said dispersion prism between said entrance surface and said exit surface is greater than substantially 65°.

36. The line-narrowing unit of claim 32, wherein an apex angle of said dispersion prism between said entrance surface and said exit surface is greater than substantially 65°.

37. The line-narrowing unit of claim 35, wherein said apex angle of said dispersion prism is greater than substantially 75°.

38. The line-narrowing unit of claim 31, wherein said dispersion prism includes an entrance surface at which said beam is incident at an entrance angle and refracted into the bulk material, and an exit surface at which said beam exits at an exit angle and refracts out of said bulk material, and wherein an apex angle prism between said entrance surface and said exit surface of said dispersion prism is large enough that at least one of said entrance angle and said exit angle is greater than Brewster's angle.

39. The line-narrowing unit of claim 38, wherein said exit angle from said dispersion prism is greater than 65°.

40. The line-narrowing unit of claim 39, wherein said entrance angle at said dispersion prism is greater than 65°.

41. The line-narrowing unit of claim 40, wherein said apex angle of said dispersion prism is greater than substantially 65°.

42. The line-narrowing unit of claim 40, wherein said apex angle of said dispersion prism is greater than substantially 75°.

43. The line-narrowing unit of claim 38, wherein said apex angle of said dispersion prism is greater than substantially 65°.

44. The line-narrowing unit of claim 26, further comprising one or more additional beam expanding prisms each made of a bulk material which is substantially transparent at an emission wavelength of said excimer or molecular fluorine laser system, said each additional prism being arranged at a particular orientation within said resonator for expanding the beam such that substantially the entire spectral bandwidth of said beam remains within an acceptance angle of said resonator while a geometric cross-sectional axis extent of said beam is increased by passing through said prism.

45. The line narrowing unit of claim 1, at least one of said entrance and exit surfaces of the prism has an anti-reflective coating formed thereon, 46. The line narrowing unit of claim 13, wherein at least one of said entrance and exit surfaces of the prism has an anti-reflective coating formed thereon.

* * * * *